May 23, 1961 — H. SCHRÖDER ET AL — 2,985,032
COCKING AND LOCKING LEVERS, ESPECIALLY FOR BRAKE RODS
Filed Jan. 22, 1959
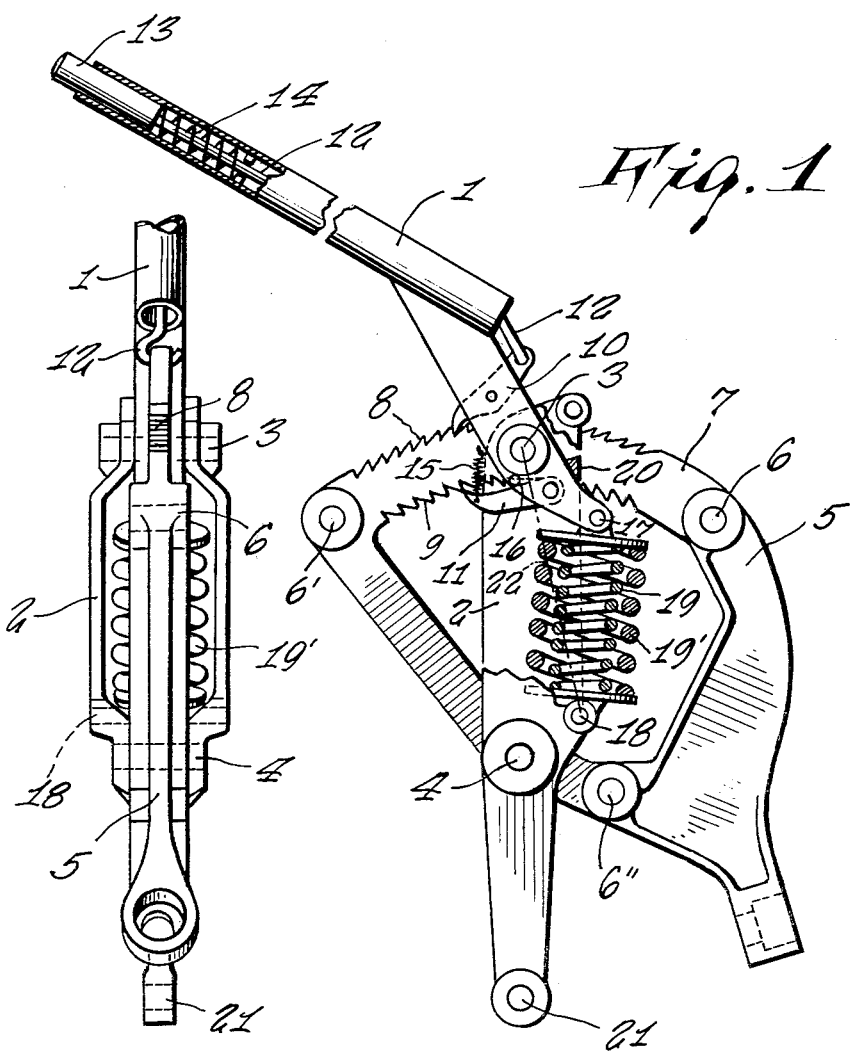
INVENTORS
HEINRICH SCHRODER,
FRANZ HOPPE
& HANS O. SCHRÖTER
BY
Hestern & Rollin
ATTORNEYS

United States Patent Office 2,985,032
Patented May 23, 1961

2,985,032
COCKING AND LOCKING LEVERS, ESPECIALLY FOR BRAKE RODS

Heinrich Schröder and Franz Hoppe, Frielendorf, Bezirk, Kassel, and Hans O. Schröter, Robert-Koch Str. 18, Munich 22, Germany Filed Jan. 22, 1959, Ser. No. 788,292

Claims priority, application Germany Feb. 3, 1958

2 Claims. (Cl. 74—536)

The present invention relates to cocking and locking levers, especially for brake rods, and has as its purpose, the provision of the greatest possible rod strength with a great lifting reserve at the rod, while requiring the shortest possible time for operation. In order to meet the increased requirements of traffic, hand brakes for heavy road and rail vehicles require the application of such an amount of energy at the hand lever that, with the available maximum manual power of about 60 kilograms and a maximum lift of about 70 centimeters, one lifting of the lever is insufficient, in many cases, to achieve the desired braking effect with the known hand-brake levers and still have available a sufficient reserve for wear of the brake lining and the elastic, thermally conditioned extension of the brake drums.

Brake levers operated by means of several lifting movements have already been proposed. However, they are disadvantageous because valuable time of operation is lost in the make-up process, since the lever cocks in only one direction. These so-called make-up brakes also cannot be loosened with sufficient sensitivity. A jerk will occur when the rod is decocked. A chauffeur, in climbing a mountain, must nevertheless be able to release the brake rod in a controlled and sensitive manner.

It has also been proposed to use brake levers functioning with one lifting, in which the play of air in the brake installation is overcome with a small gearing, whereas the real cocking phase in the operating process takes place by means of a larger gearing. Insofar as these devices require the gear shifting to be made in dependence on the type or condition of the road, they are not suitable to the extent that no consideration is given to the various rod settings actually employed in practice. Since it is necessary to operate a special auxiliary component for the shifting process, the danger is ever present that the chauffeur, especially in cases of emergency, will operate the hand brake improperly and will not achieve the required braking effect. When the shifting operation is carried out automatically in dependence on the force of the rod, the known hand-brake levers are disadvantageous in that the manual energy, at the moment of putting in gear the greater transmission phase, at first drops off considerably. This is very dangerous for the chauffeur, since he may get the impression that damage has occurred to his brake installation. He will, therefore, hesitate to further operate the brake, and thus, at best, lose valuable time. Nor do these known hand-brake levers have a sufficient reserve of travel distance on the brake rod, especially when, due to fouling or lack of maintenance, the friction losses in the power transmission have increased.

According to the invention, a locking and cocking lever, especially for brake rod is proposed, which consists of two swivelably connected components, one of which serves as a grip or actuating lever, while the other articulates at a fixed point and is connected with the brake rod. The actuating lever, serving as a grip, is provided at both sides of the joint connecting the lever components, with at least one locking member each, acting together with a solidly arranged toothed arc. The two toothed arcs are preferably arranged on the exterior and the interior of a solidly mounted arc-shaped support member.

According to another feature of the invention, a loosening device is applied to the lever component serving as grip and connected with the locking member that acts, together with the toothed arc, exteriorly of the support member, whereas the other locking member, in dependence of the position of articulation of the lever component serving as a grip, is engaged and disengaged by the impact exerted on it.

It is within the scope of the invention to interpolate a spring member between the lever components of a cocking and locking lever consisting of two pivotally connected components, one of which serves as a grip, while the other articulates at a fixed point and is connected with the rod, in such a manner that the said spring member has its greatest tension (dead-center position) when its longitudinal axis intersects the pivot axis connecting the two lever components, going beyond this dead-center position on its pivot path from one end position to the other.

In a preferred design of embodiment of the inventive idea, a spring member, formed of two coaxially arranged pressure springs, one of which is wound clockwise and the other counterclockwise, is inserted between a pivot point near the pivot axis of the lever component not serving as grip and another pivot point provided at the end of an extension of the lever component serving as a grip transcending beyond the common pivot axis.

In another embodiment of the inventive idea, the two ends of the support member, bearing the toothed arcs, form angular points of a support part in the form of a polygon on which the fixed pivot axle of the lever component not serving as a grip is provided, which support part is disposed in one plane with the spring member and delimits the required swivel space for the latter outwardly, whereas the lever component not serving as a grip has the shape of a fork and embraces both the support part and the spring member, as well as the fork-shaped end of the lever component serving as a grip that encloses the toothed arcs, by means of the legs of the said lever component serving as grip.

The cocking and locking lever in accordance with the invention may be adapted to achieve any desired rod force on the required reserved distance of the rod, and this with the shortest possible time of application. Its shifting, dependent on the energy, from the phase with small gearing, to overcome the play of air to the greater gearing active in the cocking phase, makes it independent of the rod adjustment at any particular time. The manual force constantly increases during the operation, even when the gearing is shifted to a value many times higher. Because of the new provision for a spring member, excess manual force is first accumulated, and then, i.e. when a maximum of operating force is desired, released and added to the manual strength. When, due to unusually high friction rsistance in the brake rod, the path achievable with the great gearing in the first movement is not sufficient, the chauffeur can further cock the grip, by a pivoting movement, in the opposite direction, with the greatest possible force on the rod, by pivoting the grip to and fro with slight movements of the hand.

The cocking and locking lever according to the invention possesses the additional advantage in that the chauffeur can sensitively control the decocking of the brake rod, even when the lever had been operated in several phases for the purpose of cocking. The new arrangement of the two locking members prevents any jerky reduction in the rod stress.

The new form and the arrangement of the individual components with regard to each other minimize the space requirements and make the assembling thereof a simple matter. It is easy to install the cocking and locking lever instead of customary hand-brake levers at a later time. The chauffeur needs no special training for the operation of the lever. Finally, the construction is so simple that all the above advantages can be achieved with low manufacturing costs.

Further details of the invention are shown in the drawing, which illustrates by way of example an embodiment of the inventive idea.

In the drawings:

Fig. 1 shows a cocking and locking lever according to the invention in side view, partly in section;

Fig. 2 is a front view of the same lever.

The lever, consisting of the components 1 and 2 which are connected at the point of articulation 3, is seated pivotally on a stud 4 with the lever component 2. The stud 4 is positioned on a frame-like support part 5 which is solidly screwed down at points 6, 6' and 6" to the vehicle chassis (not shown). The support part 5 bears the holder segment 7 with toothed sections 8 and 9. Two locking catches 10 and 11 are pivotally mounted on the lever component 1 and cooperate with the toothed sections 8 and 9. The locking catch 10 is connected, via a bar 12, with a sliding piece 13, which is tensioned in an outward direction by a pre-tensioned spring 14 and thus causes the locking catch 10 to rest in the toothed section 8. The catch 10 can be lifted from the toothed section 8 by pushing in the sliding piece 13 against the tension of spring 14. In the position shown according to Fig. 1, the catch 11 is not held by the toothed section 9, because it is held in the non-engaged position by a stop 16 on the lever component 1 against the pulling effect of a spring 15. The lever component 1, an extension (not shown) pointing toward the spring member 19, 19', has a point of articulation 17, the range of movement of which goes beyond a dead-center position 22 designated by the dotted line 22. Two pressure springs 19 and 19' with previously applied tension are provided between the point of articulation 18 on the lever component 2 and the point of articulation 17 on the lever component 1, so that the lever component 1 rests, with the aid of spring action, on the stop 20 provided on the lever component 2. Clockwise pivoting of the lever component 1 causes the lever component 2 to follow, with, at first, compressing of the springs 19, 19'. When the counterforce, acting against the lever component 2—which counterforce is applied by the brake rod—becomes greater than that of springs 19, 19', the lever component 2 can finally be held fast by the counterforce acting—e.g. at the point 21 of the attachment of a brake rod (not shown)—and the springs 19, 19' are further compressed. The lever component 1 now swivels further against the lever component 2, whereupon the catch 11 comes into the toothed section 9 and the lever component 1 thus rests against a solid point, to change the fulcrum of component lever 1 from stud 4 to the point of engagement between catch 11 and section 9. The operating force acting on the lever component 1 is now transmitted with a considerably increased force on the lever component 2. The springs 19, 19' finally reach the dead-center position 22 between the points of articulation 3 and 18 and support the operating force on the lever component 1 when the said dead-center position 22 is transcended. The catch 10 glides farther in the toothed section 8 and following its resting thereon holds the lever component 1 fast for the time being. Since the catch 11 rests firmly in the toothed section 9, both lever components are reliably held in each cocking position. When the space for the pivoting of the lever component 1 is only small, the lever component 2 can also be cocked further by the counterclockwise pivoting of the lever component 1, after the lever component 1 has pivoted a certain distance in clockwise direction with respect to the lever component 2. It is thus possible to achieve a so-called ratchet effect with the particularly important characteristic that no loss in the path of traveling is caused by a make-up operation.

For loosening or decocking, the sliding piece 13 is pushed in, thus lifting the catch 10 from the toothed section 8. The lever component 1 is then swiveled in the loosening direction, i.e. counterclockwise. It lifts, by means of the stop 16, shortly before reaching its stop 20, the catch 11 from the toothed section 9. It is thus possible with this construction to bring the brake rod (not shown), acting for instance at point 21, into the extreme released position with an amount of sensitive control that cannot be achieved with ratchets or make-up levers hitherto known.

We claim:

1. Cocking and locking lever device, particularly for brake rods, comprising in combination, a support member formed with a toothed segment portion, an actuating lever, a main lever pivotably secured to said support member at a point spaced from said segment portion and displaceable along said segment, said main lever having one end adapted for connection to a brake rod and another end pivotably supporting said actuating lever, a pair of alternately effective grip members carried by said actuating lever, adapted to cooperate with said segment portion, tensioning means for biasing said actuating lever to one position relative to said main lever, a stop member on said main lever, limiting the biased movement of said actuating lever, means on said actuating lever for holding one of said grip members out of engagement with said segment portion in the bias limited position of said actuating lever and manually operable means on said actuating lever for disengaging the other of said grip members from said segment at will.

2. Device according to claim 1, wherein said second tensioning means consists of a pair of coaxially disposed coil springs, one of said springs having a clockwise winding, the other of said springs having a counterclockwise winding, said actuating lever being provided with an extension for receiving one end of each of said springs, said main lever being provided with an extension for receiving the other end of each of said springs.

References Cited in the file of this patent

UNITED STATES PATENTS

| | | |
|---|---|---|
| 1,540,247 | Bowman | June 2, 1925 |
| 1,698,656 | Ream | Jan. 8, 1929 |
| 2,277,767 | La Brie | Mar. 31, 1942 |
| 2,294,667 | Jandus | Sept. 1, 1942 |
| 2,445,630 | Page | July 20, 1948 |

FOREIGN PATENTS

| | | |
|---|---|---|
| 45,007 | Austria | Nov. 25, 1910 |
| 564,096 | Great Britain | Sept. 13, 1944 |
| 715,787 | Great Britain | Sept. 27, 1954 |
| 988,020 | France | Apr. 25, 1951 |
| 993,408 | France | July 25, 1951 |